United States Patent [19]

Baker

[11] 4,400,904
[45] Aug. 30, 1983

[54] RODENT BAIT STATION

[76] Inventor: Rex O. Baker, 1776 Bobbitt Ave., Corona, Calif. 91720

[21] Appl. No.: 287,491

[22] Filed: Jul. 27, 1981

[51] Int. Cl.³ ............................................ A01M 25/00
[52] U.S. Cl. .................................... 43/131; 119/52 R
[58] Field of Search ........................ 43/131; 119/52 R

[56] References Cited

U.S. PATENT DOCUMENTS

| Re. 14,782 | 12/1919 | Hedrich et al. | 43/131 |
|---|---|---|---|
| 2,764,840 | 10/1956 | Mayfield | 43/131 |
| 2,944,364 | 7/1960 | Kelly | 43/131 |
| 2,977,711 | 4/1961 | Starr | 43/131 |
| 4,364,194 | 12/1982 | Clark, Sr. | 43/131 |

FOREIGN PATENT DOCUMENTS 6617388  5/1968  Netherlands ......................... 43/131

*Primary Examiner*—Nicholas P. Godici
*Assistant Examiner*—J. Reed Batten, Jr.
*Attorney, Agent, or Firm*—Norman L. Chalfin

[57] ABSTRACT

A rodent bait station is disclosed comprising an H-shaped enclosure in which the transverse element of the H configuration contains a baffled bait repository so disposed that the rodent may enter the station or device and have access to the bait without being able to enter the bait containing area, and also having a secured bait recharging element which may be removable and which may be stored or shipped.

11 Claims, 11 Drawing Figures

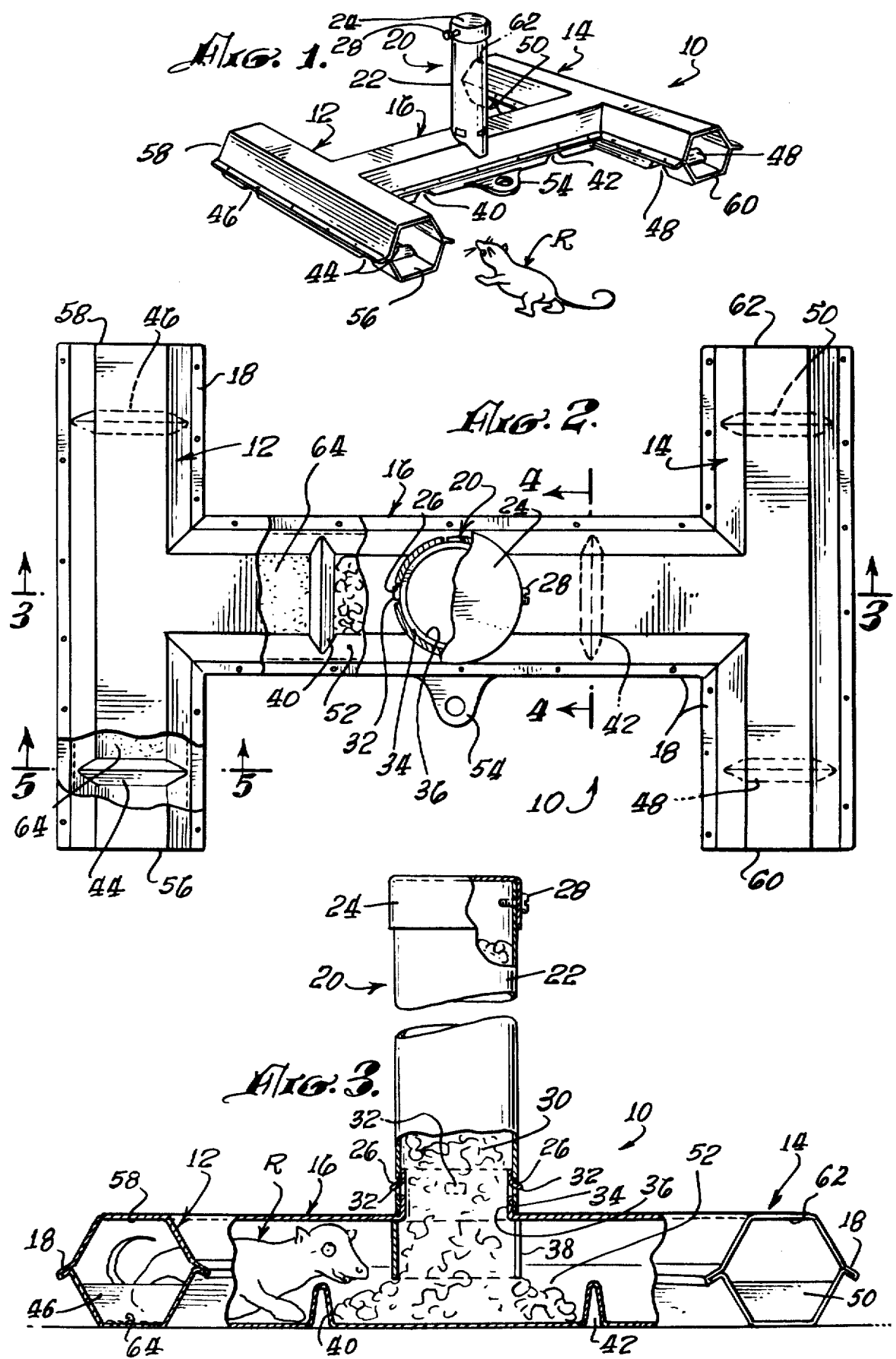

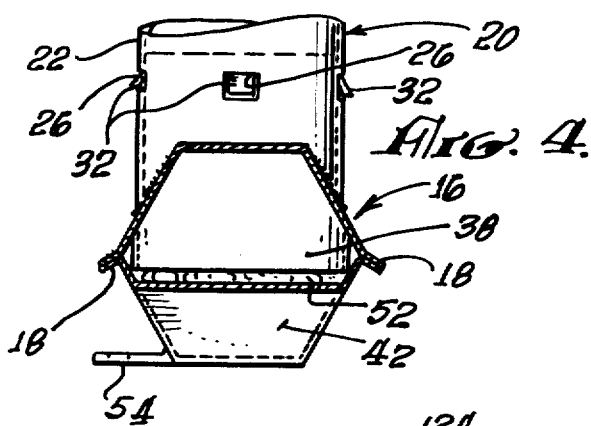
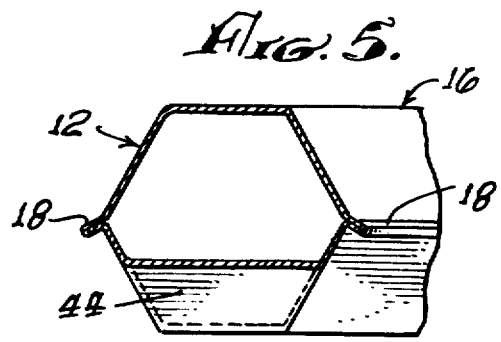
FIG. 4.  FIG. 5.
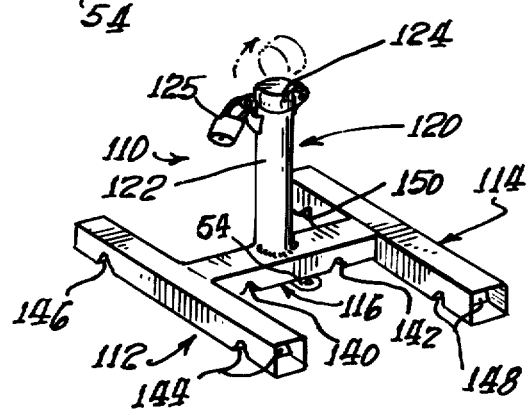
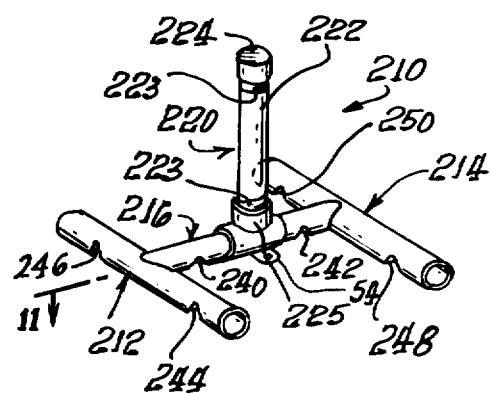
FIG. 6.  FIG. 7.
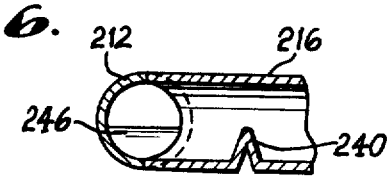
FIG. 11
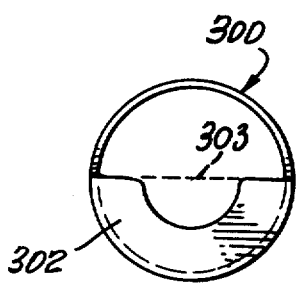
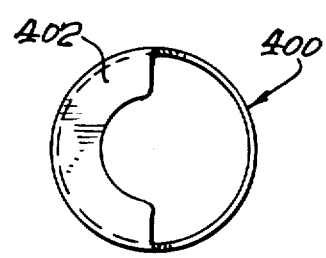
FIG. 8.  FIG. 9.
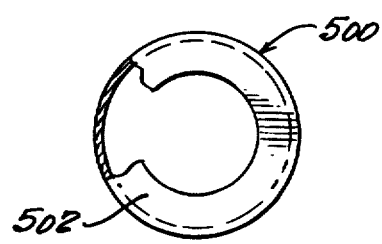
FIG. 10.

RODENT BAIT STATION

BACKGROUND OF THE INVENTION

The control of rodents and similar agricultural pests is necessary when they might carry disease, contaminate food, feed upon and destroy crops and the like. Rodents have been found to have a propensity, in the use of bait stations for their elimination, to get into the bait and excrete upon or otherwise foul the bait, making it unusable for its intended purpose since later arriving pests may not feed or enter the fouled bait station. Further, there is a greater use currently of multiple dose toxicant baits requiring sufficient quantities of bait for several days of feeding. It has been observed also that these pests tend not to enter a device which does not provide a visible exit as they enter. This is so even when they are attracted by the bait to the aperture they might otherwise go into. This shyness is further accented by large bulky shapes particularly around the entrances to the bait station.

There is a need, therefore, for rodent and similar pesticidal bait stations which provide access for the rodent and a visible egress, and in which the bait containing area is baffled to such a degree that the pest may feed and leave without being able to get into the bait itself. Also the bait station should be so constructed that entry or access by other than the pests for whom the station is intended will be difficult or impossible. It should further be of such a nature that the station cannot be entered by children or such that cildren cannot reach into the station easily. The bait containing portion of the station should be of such a nature, that it may be recharged easily, and that access to the bait recharging area may be securely locked or otherwise securely closed.

EXAMPLES OF THE PRIOR ART

In the prior art, some examples of bait stations which have been devised include boxes with covers. Within a typical box is contained a removable feed tray which is disposable. Access holes in the box are positioned above the base of the box ostensibly to prevent contamination of the bait. Some of the access holes are circular; some semicircular. Other bait boxes have been configured as an L-shaped maze of rectangular cross-section with inlet and outlet apertures pointing at right angles to one another. The animal will not see an outlet in such a device.

Another configuration involves spring-loaded mechanisms which are tripped by the entering animal. The spring-loaded mechanisms either hold the animal in the trap or destroy it. Bait boxes in this category with only single entry or entry and access in different directions are believed to defeat the purpose of such devices since they may not be entered by the animal if no immediate or apparent escape route is available to the animal.

Still another prior art system for control of rodents is a bait box which includes a tray for holding bait. The tray has a close fitting cover which is held in place by a saddle strap arrangement secured to the cover and which can engage the tray by hooking over the lips of the tray. The access hole is in the cover thus raising it above the surface base.

All of the prior art stations were designed for small rodents, rats and mice and would have small bait receptacles.

SUMMARY OF THE INVENTION

The present invention considers the problems of the prior art bait stations and provides means to eliminate these problems. Most of the rodent bait stations allow easy access directly by children or non-target animals, animal pets, livestock, birds, and so on. Often the bait is exposed in such a manner as to permit contamination of the bait by dust, water or waste materials discharged by the pests, or the loss of bait through spillage or kicking out. They do not consider the habitats or habits of the majority of rodents or similar pests. These animals are shy and oten demonstrate an aversion to the bait station over long periods of time.

The bait station of the present invention, by its low profile, burrow-type entrance and see-through design actually attracts some rodent species by offering them shelter from predators and the elements, and also a visible way out of the shelter. Some of the prior art self-feeding bait stations, such as for squirrels, must be tied up or staked to a location, and have no provision for excluding non-target animals, or prevent spillage or kickout.

The bait station of the present invention can also be staked or nailed in place, or attached to stationary objects. It includes a tamper-resistant bait loading channel which may include a locked, "pop" riveted, or otherwise secured cover to prevent children from reaching into the bait hopper. The configuration is such that children will be unable to reach into the portion of the bait station in which the bait is disposed while still permitting free access to the bait by the target animal which it is desired to control.

The rodent trap or bait station of this invention involves both baffle and maze characteristics so that exclusion, feed containment, and spill avoidance are achieved.

The areas between the interior baffles of the trap can be used to contain a toxicant tracking dust or pesticide for parasite control so that the pests are exposed to the dusts after they have fed on the attractant bait.

Thus the self-standing tamper-proof bait station of this invention meets the needs of such devices by being made of a material impervious to weather and strong enough to prohibit entry by non-target species. It has secure access means which allows access by the target species yet prevent access by larger non-target species. The maze-like configuration, with baffles suitably positioned therein, provides access to the bait but prevents contamination and so contains the toxicant food that it will not be carried outside the station. The securing or anchoring means is such as to prevent carrying the station away either by the animal or by children.

The feeding of toxicant bait to the bait zone is accomplished by one or more gravity-flow, self-feeding loaders. The cover of the loading tube, hopper or bottle may be similar to those used on modern pill bottles which require a complex pressure and rotation pattern to remove them from the bottle. Accordingly, it is an object of this invention to provide a bait station in which the toxicant bait is disposed where it can be reached by the animal to the controlled but not by non-target animals or children.

It is a further object of the invention to provide a rodent bait station in which the rodent may enter a low-profile opening and see an egress, when attracted to the toxicant bait, and after feeding on the bait leave the station without fouling the bait, spilling it or kicking it out of the bait containing area.

It is another object of the invention to provide a rodent toxicant bait station wherein baffles are used to permit access to the bait by the target animal without its being able to foul the bait, spill it, or kick it out of the station.

It is another object of the invention to provide a rodent trap or bait station wherein baffles are used to permit access to the bait by the head of the target animal without providing access by the entire animal to the bait trough.

It is a still further object of the invention to provide a bait station for rodents or similar agricultural pests which includes a maze-like configuration and a secure large volume bait refilling means and a means for retaining the station at a desired location.

And yet another object of the invention is to provide an agricultural pest, or other rodent, bait station which is secure against non-target animals, children or pets.

These and other objects of this invention will be more clear from the description which follows when taken together with the drawings and the appended claims.

BRIEF DESCRIPTION OF THE DRAWINGS

FIG. 1 is a perspective view of an embodiment of the H-shaped bait station for rodents or similar agricultural pests to show the general configuration thereof;

FIG. 2 is a top view with partial cutaways of the bait station shown in FIG. 1 to show the location and configuration of representative baffles therein;

FIG. 3 is a cross-sectional view taken along line 3—3 in FIG. 2 to show details of the components of the bait station, the baffles forming a bait trough and the secure reloading tube;

FIG. 4 is a cross-sectional view taken along line 4—4 in FIG. 2 to show a detail of the baffle located in one of the channels and forming the trough end therein;

FIG. 5 is a cross-sectional view taken along line 5—5 in FIG. 2 to show how access to one end of an entrance port is impeded for other than small animals;

FIG. 6 is a perspective view of a bait station employing a rectangular tubing for its construction;

FIG. 7 is a perspective view of a bait station according to this invention wherein cylindrical tubing is used and the components of which may be arranged for threading together;

FIGS. 8, 9 and 10 show alternative individual baffle configuration bait stations; and FIG. 11 is a cross-sectional view taken along line 11—11 in FIG. 7.

DESCRIPTION OF THE PREFERRED EMBODIMENTS

In FIG. 1 of the drawings, a perspective view of one embodiment of the rodent bait station 10 of this invention is illustrated. Other embodiments 110 and 210 are shown in FIGS. 6 and 7.

The rodent bait station 10 is constructed in an H configuration in which a pair of parallel passageways 12 and 14 are interconnected with a cross passage 16 form the "H". In the embodiment 110 shown in FIG. 6, the corresponding parallel passageways are 112 and 114; those of embodiment 210, FIG. 7, are 212 and 214. Similarly, the cross passages are respectively 116 in FIG. 6 and 216 in FIG. 7.

FIGS. 1, 6 and 7 are designed to show that a variety of cross-sectional configurations may be used for the passageways of the rodent bait station: the hexagonal form of tubing as shown in FIG. 1, the rectangular form in FIG. 6 and the circular or cylindrical form of FIG. 7.

Portions of the interior bottom surfaces (as 64 in FIG. 1) of the elements of the "H" in each instance are raised as at 40, 42, 44, 46, 48 or 50 in FIG. 1; 140, 142, and either 144, 146, 148 or 150 in FIG. 6 and 240, 242, 244, 246, 248, or 250 in FIG. 7. Details of the raised items described above may be seen in the cross-sectional views of FIGS. 3, 4 and 5 and also in the cutaway portions of FIG. 2. They form restrictions or baffles in the passageways in which they appear so that access to the passages necessitate the target animal's surmounting the restrictions. Thus a rodent must step over the restrictions to enter any passage. A child or larger animal will not gain access.

The H-configured bait station structures illustrated in FIGS. 1, 6, and 7 are free standing and stable. They cannot be easily tipped over by the target animals as at R in FIG. 1. However a perforated tab such as 54 may be included on the transverse element 16 of the H as shown in FIG. 1. A stake can be driven through the perforation in tab 54 to secure the bait station to a ground location. As shown in the figures, a similar tab such as 54 could be included on the embodiments of FIGS. 6 and 7, as well, for the purpose of staking or otherwise securing the units in place.

Extending upwardly from the transverse element 16 of FIG. 1 is a loading hopper 20 which comprises a vertical tube or bottle 22 with an articulating or otherwise liftable cap or cover 24 on top. A screw as at 28 or a pop-rivet or other means can be used to secure cap 24. The tube 22 has an opening 34 in the bottom which may be secured to transverse element 16 as illustrated in FIG. 3 on an upward extension 36 in the top surface of element 16. Many other ways of securing hopper or fill tube 20 to element 16 are possible. One is illustrated in FIGS. 3 and 4 where spaced openings 26 are engaged with tabs 32. The bottom of tube 22 may also be welded to element 16. Co-linearly with tube 22 and extending below the top inner surface of element 16 is a skirt 38, which forms a flow restriction or baffle. When toxicant bait 30 is deposited into tube 22 it falls into the bait zone 52 between baffles 40 and 42. As illustrated in FIG. 3, the rodent R may feed on the bait but because of flow restriction 38 can make no further entry into the bait zone, preventing the rodent from fouling the bait.

The target rodent will enter either of the parallel passages 56–58 or 60–62 of FIG. 1 from either end since it will see through to the opposite end. When reaching the transverse passage 16 it will enter because of the attraction of the bait, or when seeking cover. After feeding it will back out and exit since the skirt 38 obscures any view of an exit and the baffle 40 or 42 limits forward motion. The view to the rodent is as shown in FIG. 4. Similarly, if the configuration of FIGS. 6 or 7 are employed, the bait loading tubes 120 or 220 would be used to load the bait station with toxicant bait and the restrictions 140, 142 or 240, 242 will serve in the manner shown in FIG. 3. It should be noted that bottle or other secure bait containers can be used in place of tube 22, 122 or 222. When threaded means such as 223 are used for the bait loading means such as 220, the tube 222 may be removed and in its place a bait bottle with a threaded neck or top may be inserted and threaded into receptacle 225. Such an arrangement permits ready removal of the container when empty and its easy replacement.

In FIG. 6 the attachment of tube 122 to transverse element 116 is shown as it may be welded. In FIG. 7 tube 222 is shown as it may be attached to element 216 using threaded pipe techniques. The connection is made, for example, via a threaded "T" 225. Caps 124 and 224 serve the same purpose as cap 24. A lock and hasp arrangement 125 in FIG. 6 illustrates a securing means other than screw 28 or a pop-rivet. Alternatively cap 224 may be threaded onto tube 222.

Referring again to FIGS. 2, 3, 4, and 5, note should be taken of the manner in which the hexagonal tubing can be assembled from sheet material. Pairs of troughs with 3 surfaces are assembled together by sheet metal practices with lipping and fold over as shown at 18. The lips can be secured together with screws, tabs, rivets or other means. Alternatively prefabricated hexagonal tubing can be used.

In FIGS. 8, 9 and 10 alternative baffle or restriction elements 302, 402 and 502 respectively in members 300, 400 and 500 are shown which limit the bait zone or access apertures of tubing such as in FIG. 7. Restrictions of similar character can be used in tubing of any cross-section, for example as shown by dashed line 303 in FIG. 8.

FIG. 11 shows how transverse element 216 extending into parallel element 212 provides a baffle.

What is claimed is:

1. A self-standing, tamper-resistant, H-shaped rodent bait station comprising:
    a pair of parallel, open-ended members connected together at their centers by a transverse member to form an H configuration, the parallel members defining parallel passageways in communication with a transverse passageway defined by said transverse member:
    the parallel members having partial restriction means at their open ends;
    said transverse member having a pair of central restrictions extending upwardly from the inner bottom surface thereof to define a bait zone; and
    said transverse member having a central loading means extending upwardly therefrom, the loading means having a removable top cap, said cap being securable after using said loading means to charge said bait zone in said transverse member with a toxicant bait, the bottom of said loading means entering a short distance into said transverse passageway forming a skirt,
    whereby ports, formed by the open ends of said parallel members, provide an entrance and egress means for a target animal which is able to surmount said partial restriction means therein, so that the target animal may find and feed on said toxicant bait, said loading means skirt and central restrictions preventing the animal from entering said bait zone except with its head so as to feed without fouling the bait, the H configuration and partial restriction means limiting access only to the target animal and preventing larger animals or children from getting at the bait therein.

2. The rodent bait station defined in claim 1 wherein said pair of parallel member and said transverse member are constructed of hexagonal tubing.

3. The rodent bait station defined in claim 1 wherein said pair of parallel members and said transverse member are formed of rectangular tubing.

4. The rodent bait station as defined in claim 1 wherein said pair of parallel members and said transverse member are formed of tubing of circular cross-section and where the connections between said parallel and transverse members are by threaded means, and where said central loading means is threaded into said transverse member.

5. The rodent bait station as defined in claim 2 wherein a perforated tab is attached to said transverse member to provide a means for securing said bait station to a location.

6. The rodent bait station as defined in claim 3 wherein a perforated tab is attached to said transverse member to provide a means for securing said bait station to a location.

7. The rodent bait station as defined in claim 4 wherein said restrictions constitute at least partially circular elements inserted in any member thereof.

8. The rodent bait station as defined in claim 1 wherein said parallel and transverse members are interconnected by slip fitting together the ends of said transverse member into the centers of said parallel members.

9. The rodent bait station as defined in claim 8 wherein means are provided for staking the bait station securely to a surface.

10. A self-standing, tamper-resistant, H-shaped rodent bait station comprising a pair of parallel members connected together at their centers by a transverse member to form an H congifuration, the parallel members defining parallel passageways in communication with a transverse passageway defined by said transverse member:
    said parallel members having open ends forming entrance port with restrictions therein, said restrictions providing only a partial closure;
    the transverse member including a pair of centrally located spaced restrictions extending approximately half-way upwardly from the inner bottom surface of said transverse member to define a bait zone; and
    said transverse member having a central loading tube extending upwardly from the outer top surface thereof, said loading tube having a removeable top cap, said cap being securable after the loading tube has been used to charge said bait zone of the transverse member with a toxicant bait, the bottom of said central loading tube entering a short distance into said transverse passageway forming a skirt between said spaced restrictions;
    whereby the ports, formed by the open ends of said parallel members provide an entrance and egress means for a target animal able to surmount said restrictions therein, so that the target animal may find and feed on said toxicant bait, said loading tube skirt and centrally located restrictions preventing the animal from entering said bait zone except with its head so as to feed without fouling the bait, the H configuration and said restrictions forming a maze-like configuration limiting access only to the target animal and preventing larger animals or children from getting at the bait therein.

11. The bait station as defined in claim 10 wherein said central loading tube is a bottle threadable into said transverse member.

* * * * *